United States Patent
Yamazaki et al.

(10) Patent No.: US 10,141,120 B2
(45) Date of Patent: Nov. 27, 2018

(54) POWER STORAGE SYSTEM AND MANUFACTURING METHOD THEREOF AND SECONDARY BATTERY AND CAPACITOR

(75) Inventors: Shunpei Yamazaki, Tokyo (JP); Tamae Moriwaka, Kanagawa (JP); Kazutaka Kuriki, Kanagawa (JP); Mikio Yukawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1205 days.

(21) Appl. No.: 13/033,877

(22) Filed: Feb. 24, 2011

(65) Prior Publication Data
US 2011/0212363 A1    Sep. 1, 2011

(30) Foreign Application Priority Data

Feb. 26, 2010  (JP) .................. 2010-043562

(51) Int. Cl.
*H01M 6/04* (2006.01)
*H01G 11/26* (2013.01)
(Continued)

(52) U.S. Cl.
CPC ............ *H01G 11/26* (2013.01); *H01G 11/28* (2013.01); *H01G 11/32* (2013.01); *H01G 11/46* (2013.01); *H01M 4/131* (2013.01); *H01M 4/134* (2013.01); *H01M 4/1395* (2013.01); *H01M 4/366* (2013.01); *H01M 4/587* (2013.01); *H01M 4/62* (2013.01); *H01M 10/0525* (2013.01);
(Continued)

(58) Field of Classification Search
CPC .......... H01M 10/26; H01M 4/26; H01M 4/48; H01M 4/505; H01G 9/00; H01G 9/042; B82Y 99/00
USPC ... 429/206, 218.1, 231.1, 231.6, 223, 231.3, 429/231.9
See application file for complete search history.

(56) References Cited

U.S. PATENT DOCUMENTS 5,643,826 A   7/1997   Ohtani et al.
5,705,829 A   1/1998   Miyanaga et al.
(Continued)

FOREIGN PATENT DOCUMENTS

CN    001714463 A    12/2005
CN    101604762 A    12/2009
(Continued)

*Primary Examiner* — Gary D Harris
(74) *Attorney, Agent, or Firm* — Nixon Peabody LLP; Jeffrey L. Costellia (57) ABSTRACT

The present invention relates to a power storage system including a negative electrode which has a crystalline silicon film provided as a negative electrode active material on the surface of a current collector and contains a conductive oxide in a surface layer section of the crystalline silicon film. Alternatively, the present invention relates to a method for manufacturing a power storage system, which includes the step of forming an amorphous silicon film on a current collector, adding a catalytic element for promoting crystallization of the amorphous silicon, onto a surface of the amorphous silicon film, heating the amorphous silicon film with the catalytic element added to crystallize the amorphous silicon film and thereby form a crystalline silicon film, and using the crystalline silicon film as a negative electrode active material layer.

13 Claims, 5 Drawing Sheets

(51) Int. Cl.
*H01G 11/46* (2013.01)
*H01M 4/131* (2010.01)
*H01M 4/134* (2010.01)
*H01M 4/1395* (2010.01)
*H01M 4/36* (2006.01)
*H01M 4/587* (2010.01)
*H01M 4/62* (2006.01)
*H01M 10/0525* (2010.01)
*H01M 10/0561* (2010.01)
*H01G 11/28* (2013.01)
*H01G 11/32* (2013.01)
*H01M 4/02* (2006.01)

(52) U.S. Cl.
CPC .. *H01M 10/0561* (2013.01); *H01M 2004/021* (2013.01); *Y02E 60/13* (2013.01); *Y10T 29/417* (2015.01); *Y10T 29/49108* (2015.01); *Y10T 29/49115* (2015.01)

(56) References Cited

U.S. PATENT DOCUMENTS

| | | | |
|---|---|---|---|
| 6,165,824 A | 12/2000 | Takano et al. | |
| 6,685,804 B1 | 2/2004 | Ikeda et al. | |
| 6,887,511 B1 | 5/2005 | Shima et al. | |
| 7,192,673 B1 | 3/2007 | Ikeda et al. | |
| 7,195,842 B1 | 3/2007 | Fujimoto et al. | |
| 7,235,330 B1 | 6/2007 | Fujimoto et al. | |
| 7,241,533 B1 | 7/2007 | Ikeda et al. | |
| 7,410,728 B1 | 8/2008 | Fujimoto et al. | |
| 7,658,871 B2 | 2/2010 | Matsubara et al. | |
| 7,794,881 B1 | 9/2010 | Fujimoto et al. | |
| 7,811,709 B2 | 10/2010 | Musha et al. | |
| 2005/0042128 A1 | 2/2005 | Matsubara et al. | |
| 2005/0208379 A1 | 9/2005 | Musha et al. | |
| 2006/0115735 A1 | 6/2006 | Yasuda et al. | |
| 2008/0003503 A1* | 1/2008 | Kawakami | H01G 9/155 429/231.5 |
| 2008/0145752 A1 | 6/2008 | Hirose et al. | |
| 2008/0297981 A1 | 12/2008 | Endo et al. | |
| 2009/0104515 A1 | 4/2009 | Fujikawa et al. | |
| 2009/0146604 A1* | 6/2009 | Choi | H01G 9/2031 320/101 |
| 2009/0162750 A1 | 6/2009 | Kawakami et al. | 429/218.1 |
| 2009/0311608 A1 | 12/2009 | Hirose et al. | |
| 2011/0123866 A1* | 5/2011 | Pan et al. | 429/221 |
| 2011/0129732 A1* | 6/2011 | Bachrach et al. | 429/220 |

FOREIGN PATENT DOCUMENTS

| | | |
|---|---|---|
| EP | 1566855 A | 8/2005 |
| EP | 1617497 A | 1/2006 |
| JP | 07-130652 | 5/1995 |
| JP | 07-183535 | 7/1995 |
| JP | 07-183536 | 7/1995 |
| JP | 07-183537 | 7/1995 |
| JP | 10-247735 | 9/1998 |
| JP | 11-135115 A | 5/1999 |
| JP | 2001-266851 A | 9/2001 |
| JP | 2004-228059 A | 8/2004 |
| JP | 2005-071772 | 3/2005 |
| JP | 2007-299580 | 11/2007 |
| JP | 2008-153078 A | 7/2008 |
| JP | 2008-294314 | 12/2008 |
| JP | 2009-104892 A | 5/2009 |
| JP | 2009-301879 A | 12/2009 |
| JP | 2010-262752 A | 11/2010 |
| KR | 2005-0075449 A | 7/2005 |
| KR | 2009-0129951 A | 12/2009 |
| WO | WO-2004/051768 | 6/2004 |

* cited by examiner

FIG. 5C

POWER STORAGE SYSTEM AND MANUFACTURING METHOD THEREOF AND SECONDARY BATTERY AND CAPACITOR

BACKGROUND OF THE INVENTION

1. Field of the Invention

One embodiment of the invention to be disclosed relates to a power storage system and a manufacturing method therefor.

2. Description of the Related Art

In recent years, with the advance of environmental technology, the development of power generation systems (e.g., solar power generation systems) which pose less burden on the environment than conventional power generation methods has been actively conducted. Along with the development of power generation systems, power storage systems (or also referred to as a power storage device) have also been developed.

As one of the power storage systems, a secondary battery, for example, a lithium ion secondary battery (or referred to as a lithium ion storage battery or simply a lithium ion battery) can be cited (see Patent Document 1). Lithium ion secondary batteries have been widely used because they have a high energy density and are thus suitable for reduction in size.

In addition, likewise as one of power storage systems, the development of capacitors has also been promoted. As one of such capacitors, a lithium ion capacitor can be cited, for example (see Patent Document 2).

REFERENCES

Patent Documents

[Patent Document 1] Japanese Patent Application Laid-Open No. 2007-299580
[Patent Document 2] Japanese Patent Application Laid-Open No. 2008-294314

SUMMARY OF THE INVENTION

The power storage device as described above has a positive electrode including a positive electrode current collector and a positive electrode active material, a positive electrode including a negative electrode current collector and a negative electrode active material, and an electrolyte.

In particular, in the case of a lithium ion secondary battery, graphite (for example, layered graphite) is typified as the negative electrode active material. However, silicon (Si) materials are more useful as the negative electrode active material than carbon (C) materials such as graphite, because the silicon (Si) materials are ten times as large as the carbon (C) materials in terms of capacitance.

In view of the problem described above, an object of one embodiment of the invention to be disclosed is to achieve a high-capacitance negative electrode active material layer in a power storage system typified by a lithium ion secondary battery.

In addition, another object of one embodiment of the invention to be disclosed is to achieve a power storage system with characteristics (for example, cycle characteristics) improved.

One embodiment of the invention to be disclosed provides a power storage system including a negative electrode active material layer, which has a crystalline silicon film as the negative electrode active material layer, and has a conductive oxide on the surface of the negative electrode active material layer.

When a silicon material is used as the negative electrode active material, the use of crystalline silicon provides favorable battery characteristics such as cycle characteristics. This is because crystalline silicon provides faster diffusion of lithium ions as carrier ions than amorphous silicon.

It is possible to obtain crystalline silicon by crystallizing amorphous silicon through heating. In this case, a conductive oxide is contained in the crystalline silicon to keep the surface of the crystalline silicon from being oxidized to decrease the conductivity. The conductive oxide is preferably contained more in the surface layer side of the crystalline silicon. This configuration allows, in the case of using the crystalline silicon as a negative electrode active material, the conductivity as a negative electrode to be prevented from decreasing, even when the surface layer section of the crystalline silicon is oxidized.

This negative electrode can be obtained in the following way. First, a catalytic element for promoting crystallization, for example, nickel, is added to the surface of an amorphous silicon film. The amorphous silicon film with the catalytic element added is heated to crystallize the amorphous silicon film and thus obtain a crystalline silicon film. The use of the obtained crystalline silicon film as a negative electrode active material can provide a negative electrode active material layer for fast diffusion of carrier ions.

The catalytic element moves through the amorphous silicon film in the heating step for crystallization, resulting in segregation on the surface of the crystalline silicon film. In the case of using nickel as a catalytic element, the heating step forms a nickel oxide at the surface of the crystalline silicon film.

The nickel oxide is a conductive oxide. When this crystalline silicon film with the conductive oxide formed at the surface thereof is used as a negative electrode active material layer, the characteristics (for example, cycle characteristics) of the power storage system can be prevented from decreasing.

One embodiment of the invention to be disclosed relates to a power storage system characterized by including a negative electrode which has a crystalline silicon film provided as a negative electrode active material on the surface of a current collector and contains a conductive oxide in a surface layer section of the crystalline silicon film.

One embodiment of the invention to be disclosed relates to a power storage system characterized by including a negative electrode which has a crystalline silicon film provided as a negative electrode active material on the surface of a current collector and contains a conductive oxide in a surface layer section of the crystalline silicon film, in which the conductive oxide has a higher concentration in a region closer to the surface layer section in a distribution in the depth direction of the crystalline silicon film.

The conductive oxide includes one or more selected from among a nickel oxide, a copper oxide, an indium oxide, a tin oxide, and a silver oxide.

One embodiment of the invention to be disclosed relates to a secondary battery including the negative electrode described above, a positive electrode including a positive electrode current collector and a positive electrode active material layer, and an electrolyte provided between the positive electrode and the negative electrode.

The positive electrode active material layer includes a material represented by the formula $A_hM_iO_j$ ($h>0$, $i>0$, $j>0$), where the A is an alkali metal, an alkali earth metal, beryllium, or magnesium, and the M is a transition metal, and the electrolyte includes an alkali metal ion, an alkali earth metal ion, a beryllium ion, or a magnesium ion.

The positive electrode active material layer includes a material represented by the formula $A_hM_iPO_j$ (h>0, i>0, j>0), where the A is an alkali metal, an alkali earth metal, beryllium (Be), or magnesium (Mg), and the M is a transition metal, and the electrolyte includes an alkali metal ion, an alkali earth metal ion, a beryllium ion, or a magnesium ion.

One embodiment of the invention to be disclosed relates to a capacitor including the negative electrode described above, a positive electrode including a positive electrode current collector and a positive electrode active material layer, and an electrolyte provided between the positive electrode and the negative electrode.

The positive electrode active material layer includes any of activated carbon, a carbon nanotube, fullerene, and polyacene, the negative electrode active material layer has an alkali metal ion, an alkali earth metal ion, a beryllium ion, or a magnesium ion introduced, and the electrolyte includes an alkali metal ion, an alkali earth metal ion, a beryllium ion, or a magnesium ion.

One embodiment of the invention to be disclosed relates to a method for manufacturing a power storage system, which is characterized by including the steps of forming an amorphous silicon film on a current collector, adding a catalytic element for promoting crystallization of the amorphous silicon, onto a surface of the amorphous silicon film, and heating the amorphous silicon film with the catalytic element added to crystallize the amorphous silicon film and thereby form a crystalline silicon film.

One embodiment of the invention to be disclosed relates to a method for manufacturing a power storage system, which is characterized by including the steps of forming an amorphous silicon film on a current collector, adding a solution containing a catalytic element for promoting crystallization of the amorphous silicon, onto a surface of the amorphous silicon film, keeping the solution containing the catalytic element uniformly on the surface of the amorphous silicon film, and heating the amorphous silicon film with the catalytic element kept to crystallize the amorphous silicon film and thereby form a crystalline silicon film.

The catalytic element includes any one element of nickel (Ni), copper (Cu), indium (In), tin (Sn), and silver (Ag), or two or more elements thereof.

In one embodiment of the invention to be disclosed, high-capacitance silicon can be used as a negative electrode active material layer. In addition, a negative electrode active material layer of crystalline silicon can be obtained which provides fast diffusion of carrier ions. In addition, the use of this negative electrode active material layer can provide a power storage system which is excellent in characteristics (for example, cycle characteristics).

DETAILED DESCRIPTION OF THE INVENTION

Embodiments of the invention disclosed in this specification will be hereinafter described with reference to the accompanying drawings. However, the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiment mode and embodiments. It is to be noted that, in the drawings hereinafter shown, the same portions or portions having similar functions are denoted by the same reference numerals, and repeated description thereof will be omitted.

Embodiment 1

A power storage system and a method for manufacturing the power storage system according to the present embodiment will be described with reference to FIGS. 1A to 1F, FIGS. 2A to 2C, FIGS. 3A and 3B, FIGS. 4A to 4C, and FIGS. 5A to 5C.

Figure 1A:
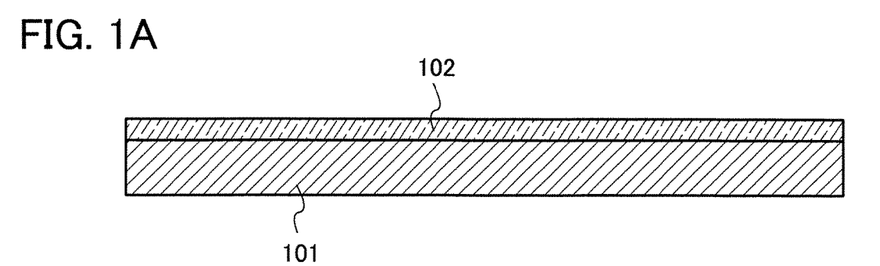
FIGS. 1A to 1F are cross-sectional views illustrating steps of manufacturing a power storage system.

An amorphous silicon film 102 as a precursor for a negative electrode active material layer 104 is formed on a negative electrode current collector 101 (see FIG. 1A).

An element such as copper (Cu), aluminum (Al), or titanium (Ti), or a compound thereof may be used as the negative-electrode current collector 101.

In the present embodiment, the amorphous silicon film 102 is deposited by plasma CVD or LPCVD.

In addition, the amorphous silicon film 102 may have a film thickness of 100 nm to 5 µm, and preferably 1 µm to 3 µm. When the film thickness of the amorphous silicon film 102 is less than 100 nm, there is a possibility that the film thickness of the negative electrode active material layer 104 may be too thin to carry out charge or discharge. In addition, when the film thickness of the amorphous silicon film 102 is greater than 5 µm, there is a possibility that the amorphous silicon film 102 will not be crystallized. Alternatively, when the film thickness of the amorphous silicon film 102 is greater than 5 µm, there is a possibility that the negative electrode active material layer 104 may be subjected to peeling due to stress change in the case of charge and discharge.

Figure 1B:
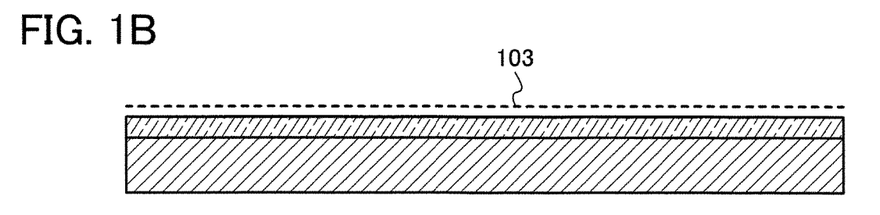

A catalytic element 103 for promoting crystallization is added onto the surface of the amorphous silicon film 102 (see FIG. 1B). As the catalytic element 103, any one element of nickel (Ni), copper (Cu), indium (In), tin (Sn), and silver (Ag), or two or more elements thereof can be used. In the present embodiment, nickel is used as the catalytic element 103.

The addition of the catalytic element 103 to the amorphous silicon film 102 allows the crystallization temperature of the amorphous silicon film 102 to be reduced by 50° C. to 100° C. Furthermore, the addition also can reduce the time required for crystallization of the amorphous silicon film 102 to ⅕ to 1/10.

Figure 3A:
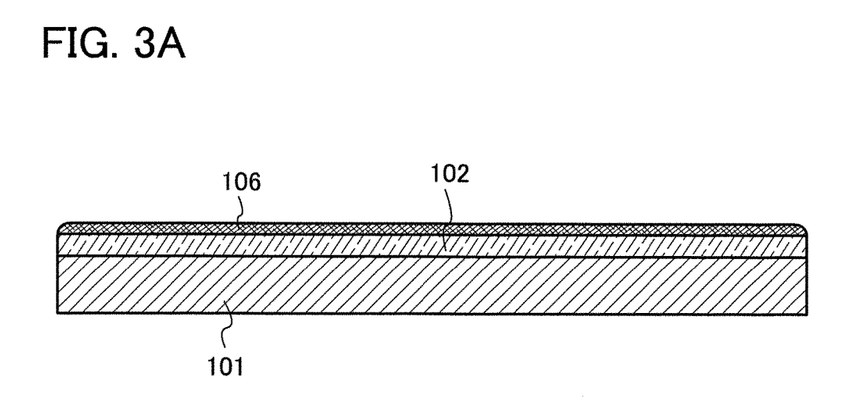
FIGS. 3A and 3B are cross-sectional views illustrating steps of manufacturing a power storage system.
Figure 3B:
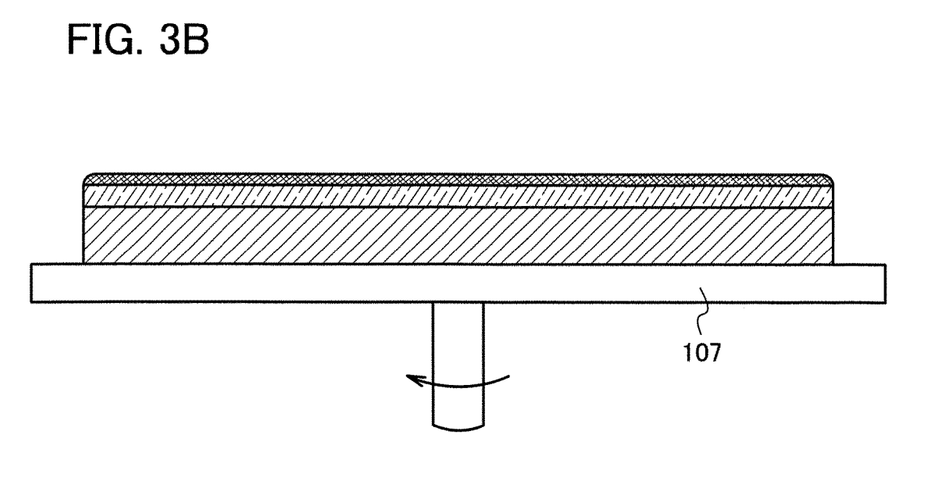

FIGS. 3A and 3B show a specific method for adding the catalytic element 103 to the surface of the amorphous silicon film 102.

First, a solution 106 containing the catalytic element 103 is added to the surface of the amorphous silicon film 102. In the embodiment, nickel is used as the catalytic element 103, and a solution of nickel acetate is used as the solution 106 containing the catalytic element 103 (see FIG. 3A).

Then, the solution 106 containing nickel is kept on the surface of the amorphous silicon film 102. A spinner 107 is used to carry out spin drying (see FIG. 3B). The spin drying can keep the catalytic element 103 more uniformly on the surface of the amorphous silicon film 102.

While the solution of nickel acetate is used as the solution 106 containing the catalytic element 103 in the present embodiment, a nickel chloride solution, a nickel nitrate solution, and a nickel sulfate solution can be used as the solution 106 in addition to the nickel acetate solution.

It is to be noted that in the case of using a solution containing water as the solution 106, there is possibility that the surface of the amorphous silicon film may repel the solution because of hydrophobicity of the surface, thereby causing a failure to add the catalytic element to the entire surface of the amorphous silicon film. Therefore, in the case of using a solution containing water as the solution 106, the surface of the amorphous silicon film may be irradiated with ultraviolet rays or the like to improve the film quality at the surface of the amorphous silicon film, before adding the solution containing nickel. More specifically, the surface of the amorphous silicon film may be improved to have hydrophilicity.

In addition, an organic octylic acid solution and toluene solution can also be used as the solution 106. The organic solutions are preferable because the solutions contain carbon which is a congener with respect to silicon and have excellent wettability with respect to the surface of the amorphous silicon film 102.

Figure 1C:
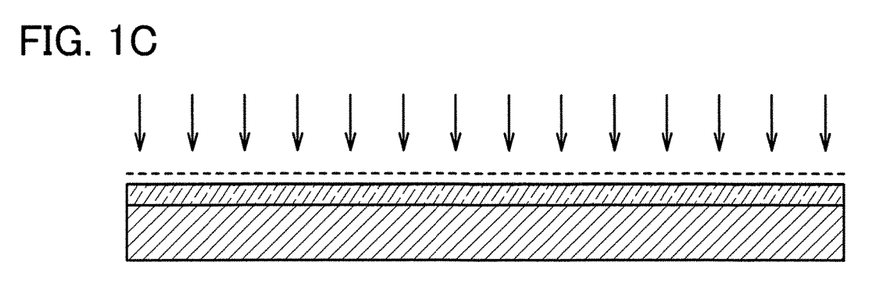

After the addition of the catalytic element 103 to the surface of the amorphous silicon film 102, the amorphous silicon film 102 is heated (see FIG. 1C). This heating step crystallizes the amorphous silicon film 102 to provide a crystalline silicon film. The thus obtained crystalline silicon film can be used as the negative electrode active material layer 104 (see FIG. 1D).

The heating step for crystallization can be carried out, for example, by heating in a heating furnace, or by light irradiation such as with laser beams, etc.

In the case of carrying out the heating step in a heating furnace, heating may be carried out at a temperature of 550° C. to 620° C., for example, 550° C. for 1 hour to 10 hours, for example, for 4 hours.

Alternatively, in the case of carrying out the heating step by laser beam irradiation, the conditions for the laser beam irradiation may be, for example, an energy density of 200 mJ/cm$^2$ to 400 mJ/cm$^2$, and typically 250 mJ/cm$^2$. In the present embodiment, laser beams from a KrF excimer laser (wavelength: 248 nm, pulse width: 20 nsec) are used as the laser beams.

The heating step causes the added catalytic element 103 move through the amorphous silicon film 102, leading to segregation of the catalytic element 103 on the surface of the crystalline silicon film when crystallization is completed. For this reason, in the crystalline silicon film, in a region closer to the surface in the depth direction (film thickness direction), the concentration of the catalytic element 103 is higher than another region of the crystalline silicon film. In addition, the catalytic element 103 is oxidized by heating to produce a conductive oxide 108. For example, in the case of using nickel as the catalytic element 103, the segregation of a nickel oxide is caused on the surface of the crystalline silicon film.

Figure 1D:
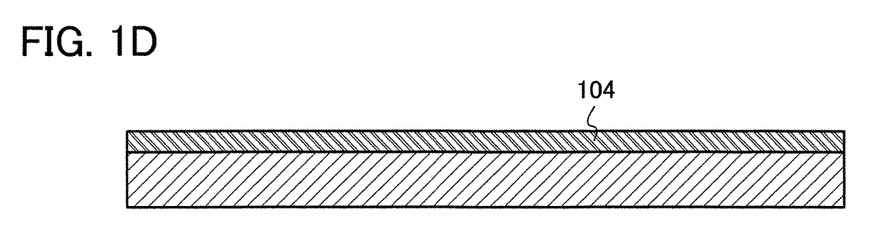
Figure 1E:
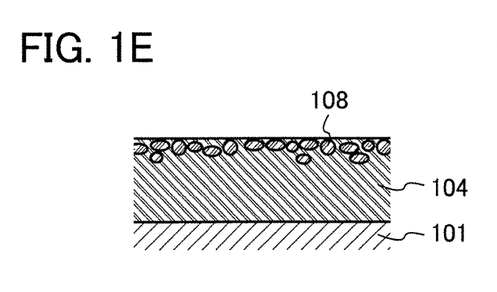
Figure 1F:
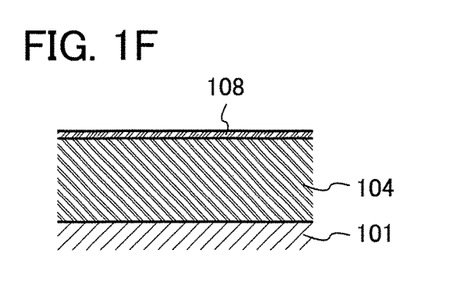

FIGS. 1E and 1F show segregation of the conductive oxide 108 segregated on the surface of the negative electrode active material layer 104 composed of a crystalline silicon film. In FIG. 1E, the conductive oxide 108 in the shape of grains is segregated in the negative electrode active material layer 104. In addition, in FIG. 1F, the conductive oxide 108 in the form a layer is segregated at the surface of the negative electrode active material layer 104.

The nickel oxide is a conductive oxide. Even when the crystalline silicon film with the conductive oxide at the surface thereof is used as the negative electrode active material layer 104, the characteristics (for example, cycle characteristics) of the power storage system can be prevented from being degraded.

In addition, in the case of using any of copper (Cu), indium (In), tin (Sn), and silver (Ag) as the catalytic element 103, the elements are respectively oxide to provide a copper oxide, an indium oxide, a tin oxide, and a silver oxide. These oxides, which are conductive oxides as in the case of the nickel oxide, can prevent degradation of the characteristics (for example, cycle characteristics) of the power storage system.

In addition, even when nickel, copper (Cu), indium (In), tin (Sn), or silver (Ag) remains as the catalytic element 103 in the crystalline silicon film as the negative electrode active material layer 104, it is not necessary to remove the catalytic element 103. This is because the catalytic element 103 is a metal and has conductivity.

A power storage system will be described below which uses the negative electrode current collector 101 and negative electrode active material layer 104 manufactured in the way described above. It is to be noted the negative electrode active material layer 104 contains the conductive oxide 108, which is segregated as shown in FIGS. 1E and 1F.

Figure 2A:
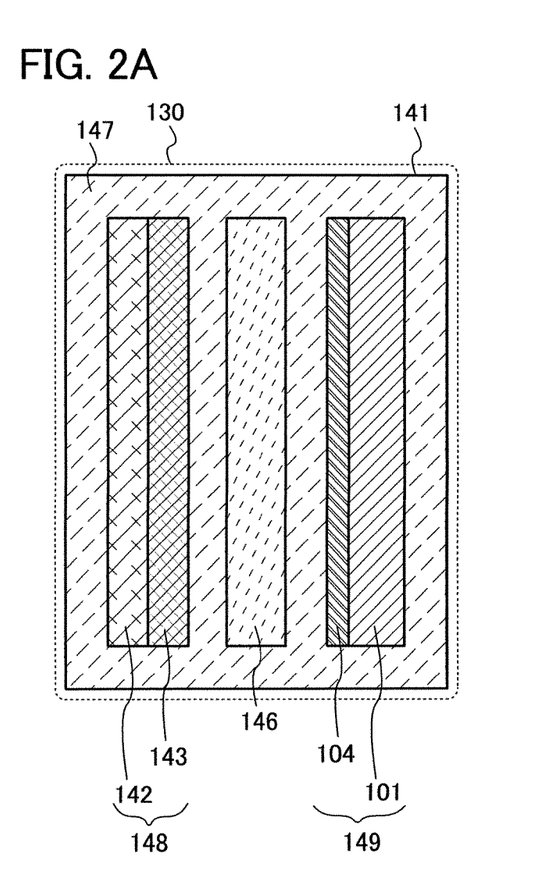
FIGS. 2A to 2C are a cross-sectional views illustrating a power storage system.
Figure 2B:
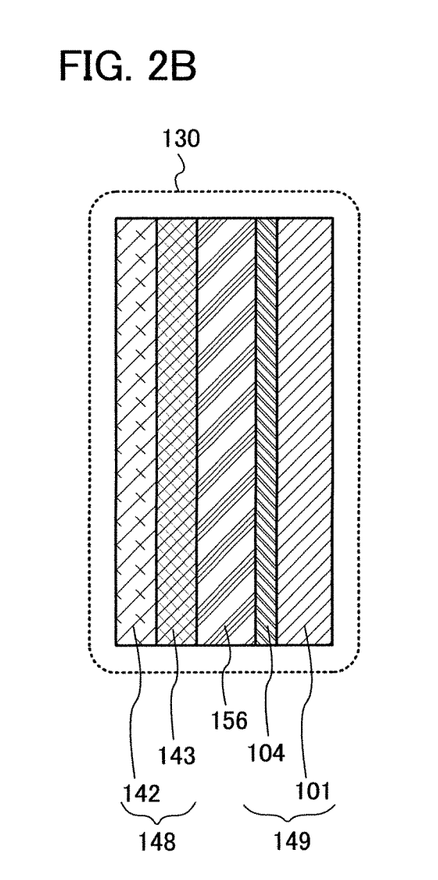
Figure 2C:
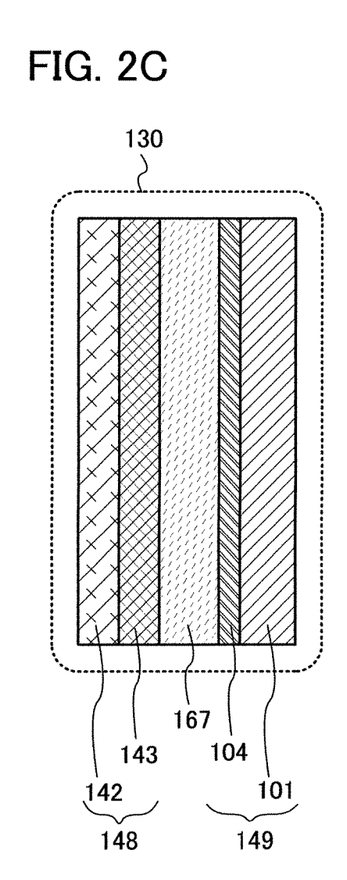

For example, a secondary battery can be cited as the power storage system. FIGS. 2A to 2C show an example of the structure of a secondary battery 130.

The secondary battery 130 according to the present embodiment has a negative electrode 149 including the negative electrode current collector 101 and the negative electrode active material layer 104 as described above, a positive electrode 148, and an electrolyte between the positive electrode 148 and the negative electrode 149.

As described above, the negative electrode 149 includes the negative electrode current collector 101 and the negative electrode active material layer 104. Therefore, a secondary battery can be obtained which exhibits a high capacitance and excellent characteristics (for example, cycle characteristics).

The positive electrode 148 includes a positive electrode current collector 142 and a positive electrode active material layer 143.

For the positive electrode current collector 142, for example, a conductive material can be used, and as the conductive material, aluminum, copper, nickel, or titanium can be used, for example. In addition, an alloy material containing two or more of the above-mentioned conductive materials can be used as the positive electrode current collector 142, and as the alloy material, an Al—Ni alloy or an Al—Cu alloy can be used, for example. Furthermore, a conductive layer provided by deposition separately on a substrate and then separated from the substrate can be also used as the positive electrode current collector 142.

As the positive electrode active material layer 143, a material containing ions to serve as carriers and a transition metal can be used, for example. As the material containing ions to serve as carriers and a transition metal, a material represented by a general formula $A_hM_iPO_j$ (h>0, i>0, j>0) can be used, for example. In the formula, A is, for example, an alkaline metal such as lithium, sodium, or potassium; an alkaline earth metal such as calcium, strontium, or barium; beryllium; or magnesium. M is, for example, a transition metal such as iron, nickel, manganese, or cobalt. The materials represented by the general formula $A_hM_iPO_j$ (h>0, i>0, j>0) include, for example, lithium iron phosphate and sodium iron phosphate. The material represented by A and the material represented by M may be one or more selected from the above materials.

Alternatively, a material represented by a general formula $A_hM_iO_j$ (h>0, i>0, j>0) can be used. In the formula, A is, for example, an alkaline metal such as lithium, sodium, or potassium; an alkaline earth metal such as calcium, strontium, or barium; beryllium; or magnesium. M is, for example, a transition metal such as iron, nickel, manganese, or cobalt. The materials represented by the general formula $A_hM_iO_j$ (h>0, i>0, j>0) include lithium cobaltate, lithium manganate, and lithium nickelate. The material represented by A and the material represented by M may be one or more selected from the above materials.

The positive electrode active material layer 143 may be formed by applying a paste mixed with a conductive additive (for example, acetylene black (AB) or a binder (for example, polyvinylidene fluoride (PVDF))) onto the positive electrode current collector 142, or formed by sputtering. In the case of forming the positive electrode active material layer 143 by a coating method, pressure forming may also be employed, if necessary.

It is to be noted that strictly speaking, the term "active material" refers only to a material related to insertion and elimination of ions to serve as carriers. In this specification, however, in the case of using a coating method to form the positive electrode active material layer 143, for the sake of convenience, the positive electrode active material layer 143 collectively refers to the material of the positive electrode active material layer 143, that is, a substance that is actually a "positive electrode active material," a conductive additive, a binder, etc.

Now, a method will be described for manufacturing the positive electrode active material layer 143, as well as the positive electrode 148 including the positive electrode active material layer 143 on the positive electrode current collector 142.

First, the positive electrode current collector 142 is prepared. The material and formation method for the positive electrode current collector 142 have been already described above, and will be thus omitted.

Then, the positive electrode active material layer 143 is formed on the positive electrode current collector 142. The material of the positive electrode active material layer 143 has been mentioned above. In addition, as for the method for forming the positive electrode active material layer 143, the positive electrode active material layer 143 may be formed by sputtering method or a coating method as described above. Accordingly, the positive electrode 148 comprises the positive electrode active material layer 143 formed on the positive electrode current collector 142.

In the case of forming the positive electrode active material layer 143 by a coating method, the material for the positive electrode active material layer 143 is mixed with a conduction auxiliary agent, a binder, etc. to form a paste, and the paste is applied onto the positive electrode current collector 142 and dried to form the positive electrode active material layer 143. In the case of forming the positive electrode active material layer 143 by a coating method, pressure forming may be employed, if necessary.

It is to be noted that as the conductive additive, an electron-conductive material may be used which causes no chemical change in the power storage system. For example, a carbon-based material such as graphite or carbon fibers, a metal material such as copper, nickel, aluminum, or silver, or powders or fibers of a mixture thereof can be used.

It is to be noted that examples of the binder include polysaccharides, thermoplastic resins, and polymers with rubber elasticity, and the like. For example, starch, carboxymethylcellulose, hydroxypropylcellulose, regenerated cellulose, diacetylcellulose, polyvinylchloride, polyvinylpyrrolidone, polytetrafluoroethylene, polyvinylide fluoride, polyethylene, polypropylene, ethylene-propylene-diene monomer (EPDM), sulfonated EPDM, styrene-butadiene rubber, butadiene rubber, fluorine rubber, or the like can be used. In addition, polyvinyl alcohol, polyethylene oxide, or the like may be used.

After forming the positive electrode 148 and the negative electrode 149, an electrolyte is provided between the positive electrode 148 and the negative electrode 149.

As the electrolyte, an electrolyte solution that is an electrolyte in a liquid state, a solid electrolyte that is an electrolyte in a solid state may be used. The electrolyte solution contains an alkali metal ion, an alkali earth metal ion, a beryllium ion, or a magnesium ion as a carrier ion, and this carrier ion is responsible for electric conduction. Examples of the alkali metal ion include, for example, a lithium ion, a sodium ion, and potassium ion. Examples of the alkali earth metal ion include, for example, a calcium ion, a strontium ion, and a barium ion.

The electrolyte solution 147 is composed of, for example, a solvent, and of a lithium salt or a sodium salt dissolved in the solvent. Examples of thee lithium salt include, for example, lithium chloride (LiCl), lithium fluoride (LiF), lithium perchlorate (LiClO$_4$), lithium tetrafluoroborate (LiBF$_4$), LiAsF$_6$, LiPF$_6$, and Li(C$_2$F$_5$SO$_2$)$_2$N. Examples of the sodium salt include, for example, sodium chloride (NaCl), sodium fluoride (NaF), sodium perchlorate (NaClO$_4$), and sodium tetrafluoroborate (NaBF$_4$).

Examples of the solvent for the electrolyte solution 147 include, for example, cyclic carbonates such as ethylene carbonate (hereinafter abbreviated as EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), methylpropyl carbonate (MPC), methylisobutyl carbonate (MIBC), and dipropyl carbonate (DPC); aliphatic carboxylic acid esters such as methyl formate, methyl acetate, methyl propionate, and ethyl propionate; γ-lactones such as γ-butyrolactone; acyclic ethers such as 1,2-dimethoxyethane (DME), 1,2-diethoxyethane (DEE), and ethoxymethoxy ethane (EME); cyclic ethers such as tetrahydrofuran and 2-methyltetrahydrofuran; dimethylsulfoxide; 1,3-dioxolane and the like; alkyl phosphate esters such as trimethyl phosphate, triethyl phosphate, and trioctyl phosphate and fluorides thereof, all of which can be used either alone or in combination.

As a separator 146, paper, nonwoven fabric, a glass fiber, a synthetic fiber such as nylon (polyamide), vinylon (also referred to as vinalon) (a polyvinyl alcohol based fiber), polyester, acrylic, polyolefin, or polyurethane, etc. may be used. However, it is necessary to select a material which does not dissolve in an electrolyte solution 147 described later.

More specifically, examples of the material for the separator 146 include fluorine-based polymers, polyethers such as a polyethylene oxide and a polypropylene oxide, polyolefins such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane based polymers, and derivatives thereof, cellulose, paper, and nonwoven fabric, all of which can be used either alone or in a combination.

The secondary battery shown in FIG. 2A has the separator 146 between the positive electrode 148 and the negative electrode 149. The secondary battery has the positive electrode 148, negative electrode 149, and separator 146 placed in a chassis 141, and includes the electrolyte solution 147 in the chassis 141.

FIG. 2B shows an example of a secondary battery which has a different structure from that in FIG. 2A. In the case of a secondary battery 130 in FIG. 2B, a separator 156 provided between the positive electrode 148 and the negative electrode 149 is impregnated with an electrolyte solution that is an electrolyte in a liquid state.

In the case of the secondary battery 130 shown in FIG. 2B, the separator 156 is preferably a porous film. As a material for the porous film, a synthetic resin material, a ceramic material, etc. may be used. Examples of the material for the porous film preferably include polyethylene, polypropylene, etc.

Furthermore, FIG. 2C shows an example in which a solid electrolyte 167 is provided between a positive electrode 148 and a negative electrode 149.

Examples of the solid electrolyte 167 include a polymer electrolyte and a gel electrolyte. Examples of the polymer electrolyte include composite materials of a polymer typified by polyethylene oxide (abbreviation: PEO) and polypropylene oxide (abbreviation: PPO) and of the lithium salt mentioned above. In addition, the sodium salt mentioned above may be used in place of the lithium salt.

Examples of the gel electrolyte (polymer-gel electrolyte) include a host polymer which is used as a support and contains the electrolyte solution described above. As the host polymer, a copolymer PVDF-HFP of polyvinylidene fluoride (also referred to as polyvinylidene fluoride abbreviated as PVDF) and hexafluoropropylene (HFP), polyethylene oxide (PEO), porous PVDF, or the like, is used.

The solid electrolyte 167 contains an electrolyte solution in a liquid state, which is in a quasi-solid state as a whole. Leakage is less likely to be caused because the solid electrolyte 167 is in a quasi-solid state as a whole. The solid electrolyte 167 is less likely to cause leakage, and thus highly safe.

The secondary battery 130 manufactured in the way described above can have a variety of structures such as a button type, a stack type, a cylindrical type, and a laminate type.

As described above, high-capacitance silicon can be used as the negative electrode active material layer in the present embodiment. In addition, according to the present embodiment, a negative electrode active material layer of crystalline silicon can be obtained which provides fast diffusion of carrier ions. The use of this negative electrode active material layer can provide a secondary battery which exhibits excellent characteristics (for example, cycle characteristics).

Figure 4A:
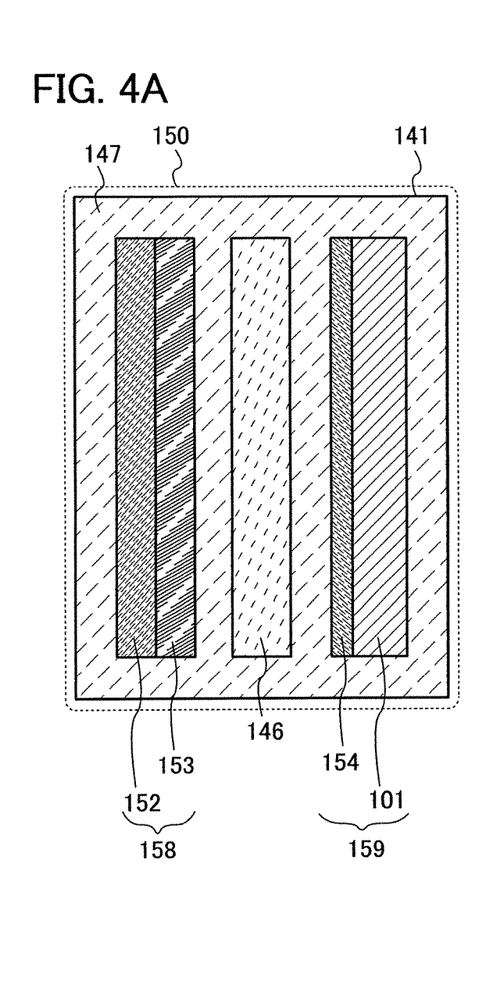
FIGS. 4A to 4C are a cross-sectional views illustrating a power storage system.
Figure 4B:
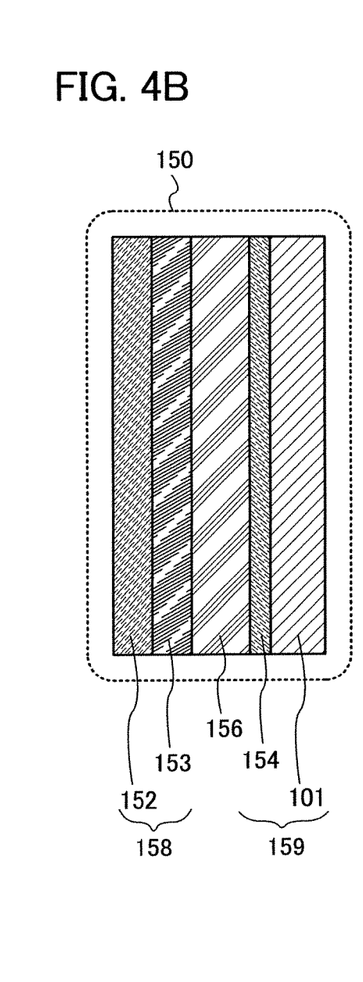
Figure 4C:
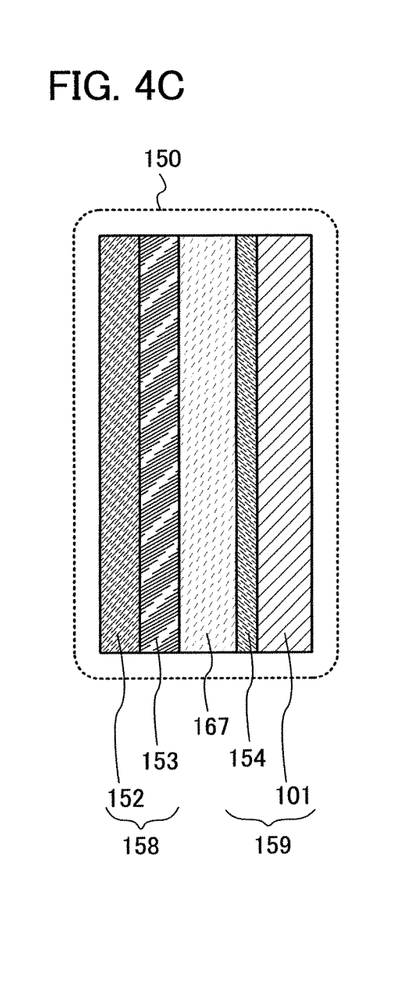

Furthermore, a capacitor can be cited as another example of the power storage system. FIGS. 4A to 4C show an example of the structure of a capacitor 150.

The capacitor 150 according to the present embodiment has a negative electrode 159 including the negative electrode current collector 101 described above and a negative electrode active material layer 154. The negative electrode active material layer 154 is formed by introducing carrier ions in advance into the negative electrode active material layer 104 described above. The introduction of carrier ions in advance allows more ions as carriers to be used.

Figure 5A:
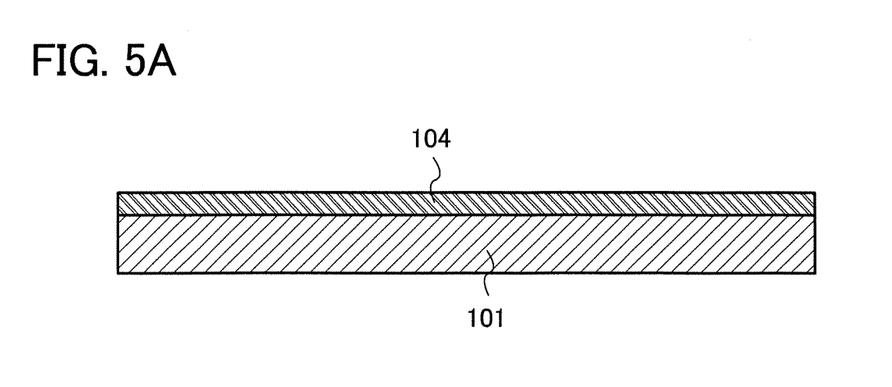
FIGS. 5A to 5C are cross-sectional views illustrating steps for manufacturing a liquid crystal display device.
Figure 5B:
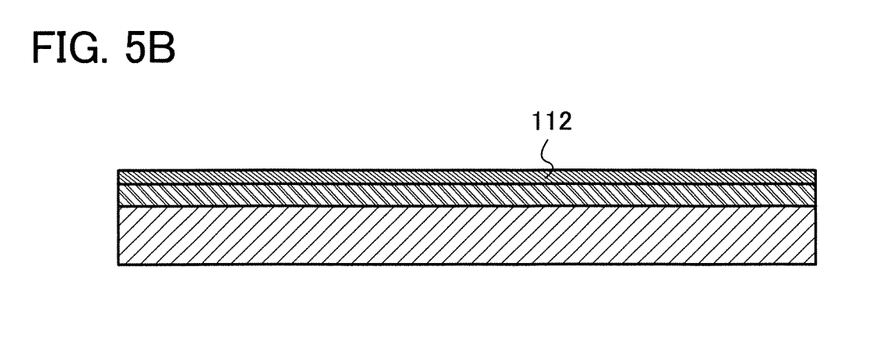
Figure 5C:
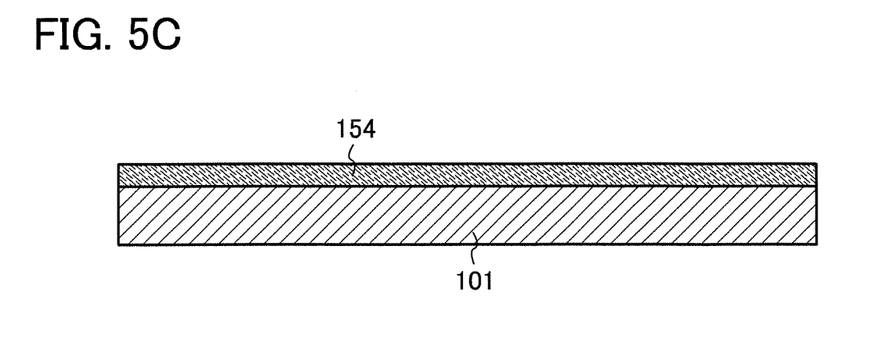

A method will be described below in which carrier ions are introduced into the negative electrode active material layer 104 in advance (also referred to as pre-doping) to form the negative electrode active material layer 154.

First, the manufacturing steps from FIG. 1A up to FIG. 1D, that is, the steps up to the formation of a crystalline silicon film as the negative electrode active material layer 104 on the negative electrode current collector 101 are carried out (see FIG. 5A).

Then, a metal layer 112 containing carrier ions is formed on the crystalline silicon film as the negative electrode active material layer 104 (see FIG. 5B). The carrier ions may be an alkali metal ion, an alkali earth metal ion, a beryllium ion, or a magnesium ion as described above.

As the metal layer 112, metals including the carrier ions described above can be used. While an example is described in which a metal sheet composed of an alkali metal, an alkaline earth metal, beryllium, or magnesium is prepared separately to form the metal layer 112 in the present embodiment, the formation of the metal layer 112 is not limited thereto. For example, the metal layer 112 can be deposited by using chemical vapor deposition, physical vapor deposition method, etc. As the chemical vapor deposition, for example, CVD can be used, and as the physical vapor deposition, for example, sputtering or vacuum deposition can also be used. It is to be noted that while the metal layer 112 is shown to have a uniform thickness in FIG. 5B, the metal layer 112 is not limited thereto, and the metal layer 112 may include multiple sections differing in film thickness or may have multiple divided sections.

Then, after the formation of the metal layer 112 on the negative electrode active material layer 104, the negative electrode active material layer 104 provided with the metal layer 112 is immersed in an electrolyte solution to impregnate the negative electrode active material layer 104 with the electrolyte solution while ionizing the metal layer 112.

The ionization of the metal layer 112 proceeds with time, to form the negative electrode active material layer 154 as shown in FIG. 5C. It is to be noted that while an example is illustrated in FIG. 5C in which the entire metal layer 112 is ionized to impregnate the negative electrode active material layer 104, the pre-doping is not limited thereto, and a portion of the metal layer 112 may remain on a surface of the negative electrode active material layer 154.

The introduction of carrier ions into the negative electrode in advance lowers the electric potential of the negative electrode, thereby allowing a high withstand voltage to be achieved with the use of a potential difference between the negative electrode and the positive electrode.

In addition, the capacitor 150 according to the present embodiment has a positive electrode 158 including a positive electrode current collector 152 and a positive electrode active material layer 153, and an electrolyte between the positive electrode 158 and the negative electrode 159 (see FIGS. 4A to 4C).

The positive electrode current collector 152 is the same as the positive electrode current collector 142 shown in FIGS. 2A to 2C.

The positive electrode active material layer 153 can be formed by using activated carbon, a carbon nanotube, fullerene, polyacene, etc. In addition, the positive electrode active material layer 153 may be formed by sputtering method or a coating method.

Alternatively, the same material as the negative electrode active material layer 104, that is, a crystalline silicon film obtained by crystallizing an amorphous silicon film with nickel can be used as the positive electrode active material layer 153.

In the case of forming the positive electrode active material layer 153 by a coating method, the material for the positive electrode active material layer 153 may be mixed with a conductive additive, a binder, etc. to form a paste, and the paste may be applied onto the positive electrode current collector 152 to form the positive electrode active material layer 153. In the case of forming the positive electrode active material layer 153 by a coating method, pressure forming may also be employed, if necessary.

It is to be noted that strictly speaking, the term "active material" refers only to a material related to insertion and elimination of ions to serve as carriers. In this specification, however, in the case of using a coating method to form the positive electrode active material layer 153, for the sake of convenience, the positive electrode active material layer 153 collectively refers to the material of the positive electrode active material layer 153, that is, a substance that is actually a "positive electrode active material," a conductive additive, a binder, etc.

The capacitor 150 shown in FIGS. 4A to 4C has the structure of the secondary battery 130 shown in FIGS. 2A to 2C. More specifically, the capacitor 150 in FIG. 4A has the same structure as that of the secondary battery 130 shown in FIG. 2A, and includes a separator 146 between the positive electrode 158 and the negative electrode 159. The capacitor 150 has the positive electrode 158, negative electrode 159, and separator 146 placed in a chassis 141, and includes the electrolyte solution 147 in the chassis 141.

The capacitor 150 shown in FIG. 4B has the same structure as that of the secondary battery 130 shown in FIG. 2B, and refers to a capacitor with a separator 156 provided between the positive electrode 158 and the negative electrode 159 and impregnated with an electrolyte solution that is an electrolyte in a liquid state.

The capacitor 150 shown in FIG. 4C has the same structure as that of the secondary battery 130 shown in FIG. 2C, and includes a solid electrolyte 167 between the positive electrode 158 and the negative electrode 159.

The capacitor 150 manufactured in the way described above can have a variety of structures such as a button type, a stack type, a cylindrical type, and a laminate type.

As described above, high-capacitance silicon can be used as the negative electrode active material layer in the present embodiment. In addition, according to the present embodiment, a negative electrode active material layer of crystalline silicon can be obtained which provides fast diffusion of carrier ions. The use of this negative electrode active material layer can provide a capacitor which exhibits excellent characteristics (for example, cycle characteristics).

This application is based on Japanese Patent Application serial no. 2010-043562 filed with Japan Patent Office on Feb. 26, 2010, the entire contents of which are hereby incorporated by reference.

What is claimed is:

1. A power storage system comprising:
a negative electrode comprising:
a current collector;
a negative electrode active material layer comprising a crystalline silicon film over and in contact with an upper surface of the current collector; and
a conductive oxide over and in contact with an upper surface of the crystalline silicon film,
wherein the conductive oxide comprises
one selected from the group consisting of nickel, copper, indium, tin, and silver.

2. The power storage system according to claim 1, wherein the power storage system is a secondary battery, and the secondary battery further comprises:
a positive electrode including a positive electrode current collector and a positive electrode active material layer; and
an electrolyte provided between the positive electrode and the negative electrode.

3. The secondary battery according to claim 2, wherein the positive electrode active material layer comprises a material represented by the formula $A_h M_i O_j$ (h>0, i>0, j>0), where the A is one of alkali metal, alkali earth metal, beryllium, and magnesium, and the M is transition metal, and
wherein the electrolyte comprises at least one of alkali metal, alkali earth metal, beryllium, and magnesium.

4. The secondary battery according to claim 2, wherein the positive electrode active material layer comprises a material represented by the formula $A_h M_i PO_j$ (h>0, i>0, j>0), where the A is one of alkali metal, alkali earth metal, beryllium, and magnesium, and the M is transition metal, and
wherein the electrolyte comprises at least one of alkali metal, alkali earth metal, beryllium, and magnesium.

5. The power storage system according to claim 1, wherein the power storage system is a capacitor, and the capacitor further comprises:
a positive electrode including a positive electrode current collector and a positive electrode active material layer; and
an electrolyte provided between the positive electrode and the negative electrode.

6. The capacitor according to claim 5, wherein the positive electrode active material layer comprises any of activated carbon, a carbon nanotube, fullerene, and polyacene,
wherein the negative electrode active material layer includes at least one of alkali metal, alkali each metal, beryllium, and magnesium, and
wherein the electrolyte comprises at least one of alkali metal, alkali earth metal, beryllium, and magnesium.

7. A power storage system comprising:
a negative electrode comprising:
a current collector;
a negative electrode active material layer comprising a crystalline silicon film over and in contact with an upper surface of the current collector; and
a plurality of conductive oxides segregated on an upper surface of the crystalline silicon film,
wherein each of the plurality of conductive oxide comprises
one selected from the group nickel oxide, copper oxide, indium oxide, tin oxide, and silver oxide.

8. The power storage system according to claim 7, wherein the power storage system is a secondary battery, and the secondary battery further comprises:

a positive electrode including a positive electrode current collector and a positive electrode active material layer; and an electrolyte provided between the positive electrode and the negative electrode.

9. The secondary battery according to claim 8, wherein the positive electrode active material layer comprises a material represented by the formula $A_h M_i O_j$ (h>0, i>0, j>0), where the A is one of alkali metal, alkali earth metal beryllium, and magnesium, and the M is transition metal, and wherein the electrolyte comprises at least one of the alkali metal, alkali each metal, beryllium, and magnesium.

10. The secondary battery according to claim 8, wherein the positive electrode active material layer comprises a material represented by the formula $A_h M_i PO_j$ (h>0, i>0, j>0), where the A is one of alkali metal, alkali earth metal, beryllium, and magnesium, and the M is transition metal, and wherein the electrolyte comprises at least one of alkali metal, alkali earth metal, beryllium, and magnesium.

11. The power storage system according to claim 7, wherein the power storage system is a capacitor, and the capacitor further comprises:

a positive electrode including a positive electrode current collector and a positive electrode active material layer; and an electrolyte provide between the positive electrode and the negative electrode.

12. The capacitor according to claim 11, wherein the positive electrode active material layer comprises any of activated carbon, a carbon nanotube, fullerene, and polyacene, wherein the negative electrode active material layer includes at least one of alkali metal, alkali earth metal, beryllium, and magnesium, and wherein the electrolyte comprises at least one of alkali metal, alkali each metal, beryllium, and magnesium.

13. A power storage system comprising:

a negative electrode over a current collector, wherein the negative electrode comprises a crystalline silicon film and nickel oxide in a surface layer section of the crystalline silicon film.

* * * * *